United States Patent
Sun et al.

(10) Patent No.: US 11,863,006 B2
(45) Date of Patent: Jan. 2, 2024

(54) METHOD AND APPARATUS FOR DETERMINING CHARGING CIRCUIT, ELECTRONIC DEVICE, AND STORAGE MEDIUM

(71) Applicant: BEIJING XIAOMI MOBILE SOFTWARE CO., LTD., Beijing (CN)

(72) Inventors: Changyu Sun, Beijing (CN); Hang Ren, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 183 days.

(21) Appl. No.: 17/246,542

(22) Filed: Apr. 30, 2021

(65) Prior Publication Data

US 2022/0045539 A1 Feb. 10, 2022

(30) Foreign Application Priority Data

Aug. 7, 2020 (CN) .......................... 202010789338.5

(51) Int. Cl.
*H02J 7/00* (2006.01)

(52) U.S. Cl.
CPC ...... *H02J 7/007192* (2020.01); *H02J 7/0068* (2013.01); *H02J 2310/22* (2020.01)

(58) Field of Classification Search
CPC .............................................. H02J 7/007192
(Continued)

(56) References Cited

U.S. PATENT DOCUMENTS

2012/0133336 A1* 5/2012 Han ..................... H02J 7/00711
320/145
2014/0167509 A1* 6/2014 Fernald .................. H02M 3/07
307/31
(Continued)

FOREIGN PATENT DOCUMENTS

EP 3288149 2/2018

OTHER PUBLICATIONS

Gabian Gabriel Alejo et al: "High-current integrated battery chargers for mobile applications High-current integrated battery chargers for mobile applications Recommended Citation Recommended citation",Aug. 31, 2017 (Aug. 31, 2017), XP055845648,Retrieved from the Internet: URL:https://trace. tennessee.edu/cgi/viewcontent. cqi? article-6199&context=utk_gradths [retrieved on Sep. 28, 2021] section 3* the whole document * . (117 pages).

(Continued)

*Primary Examiner* — Yalkew Fantu
(74) *Attorney, Agent, or Firm* — Arch & Lake LLP

(57) ABSTRACT

A method for determining a charging circuit, includes: acquiring a preset equivalent circuit model including a preset number of charging paths, wherein one or more of the preset number of charging paths includes a controllable device; controlling an operating state of each controllable device to obtain initial equivalent circuits each including respective different charging paths; acquiring a charging current in each charging path of each of the initial equivalent circuits in a charging state; for each of the initial equivalent circuits, acquiring a heat loss value of the initial equivalent circuit based on the charging current in each charging path of the initial equivalent circuit and a resistance value of each equivalent device in the equivalent circuit model; and determining one of the initial equivalent circuits having a mini-
(Continued)

mum heat loss value under a same condition as a target charging circuit.

12 Claims, 6 Drawing Sheets

(58) Field of Classification Search
USPC .......................................................... 320/137
See application file for complete search history.

(56) References Cited

U.S. PATENT DOCUMENTS

| | | |
|---|---|---|
| 2015/0028803 A1 | 1/2015 | Shevde et al. |
| 2015/0222135 A1 | 8/2015 | Lee |
| 2017/0093201 A1 | 3/2017 | Shevde et al. |
| 2018/0069272 A1* | 3/2018 | Seo ....................... H01M 10/44 |
| 2020/0119410 A1* | 4/2020 | Tian ........................ H02J 7/007 |
| 2020/0161976 A1 | 5/2020 | Song et al. |

OTHER PUBLICATIONS

Supplementary European Search Report in the European application No. 21171210.4, dated Oct. 18, 2021. (9 pages).

\* cited by examiner

METHOD AND APPARATUS FOR DETERMINING CHARGING CIRCUIT, ELECTRONIC DEVICE, AND STORAGE MEDIUM

CROSS-REFERENCE TO RELATED APPLICATION

This application is based on and claims priority to Chinese Patent Application No. 2020107893385, filed on Aug. 7, 2020, which is incorporated herein by reference in its entirety.

TECHNICAL FIELD

The disclosure relates to the technical field of designs for quick charging, and particularly to a method and apparatus for determining a charging circuit, an electronic device, and a storage medium.

BACKGROUND

Currently, quick charging techniques have been used in most electronic devices, such as smartphones. A mainstream charging scheme lies in a combination of a power management integrated circuit (Power Management IC, PMIC) and a 2:1 charge pump, and two 2:1 charge pumps are typically used when the charging power exceeds 30 W in practical applications. Since the 2:1 charge pump cannot limit the magnitude of the current, and the charging current can only be controlled by the ratio of an input-output voltage difference to an impedance value, the current distribution of the two 2:1 charge pumps is closely related to the path impedance.

Without considering the influence of the PMIC shunting the charging current, it may be possible to calculate only the charging current distributed to the impedance of the two 2:1 charge pumps. In this case, the model is simple, and it is easy to make and solve an equation. However, in existing charging schemes, the PMIC also shunts the charging current. For example, a charger with a PMIC may be integrated with a 3-LEVEL architecture, and a large part of current may be shunted by the PMIC, leaving the actual circuit having three parallel charging paths, which makes the model more complicated. In this case, if the influence of shunting is ignored, the designed charging scheme may be affected.

SUMMARY

Provided in the disclosure are a method and apparatus for determining a charging circuit, an electronic device, and a storage medium to address deficiencies of the related art.

According to a first aspect of embodiments of the disclosure, provided is a method for determining a charging circuit, including: acquiring a preset equivalent circuit model including a preset number of charging paths, wherein one or more of the preset number of charging paths include a controllable device; controlling an operating state of each controllable device to obtain initial equivalent circuits, wherein each of the initial equivalent circuits include respective different charging paths; acquiring a charging current in each charging path of each of the initial equivalent circuits in a charging state; for each of the initial equivalent circuits, acquiring a heat loss value of the initial equivalent circuit based on the charging current in each charging path of the initial equivalent circuit and a resistance value of each equivalent device in the equivalent circuit model; and determining one of the initial equivalent circuits having a minimum heat loss value under a same condition as a target charging circuit.

According to a second aspect of embodiments of the disclosure, provided is an apparatus for determining a charging circuit, including: a processor; and a memory for storing a computer program executable by the processor; wherein the processor is configured to execute the computer program in the memory to: acquire a preset equivalent circuit model including a preset number of charging paths, wherein one or more of the preset number of charging paths include a controllable device; control an operating state of each controllable device to obtain initial equivalent circuits, wherein each of the initial equivalent circuits include respective different charging paths; acquire a charging current in each charging path of each of the initial equivalent circuits in a charging state; for each of the initial equivalent circuits, acquire a heat loss value of the initial equivalent circuit based on the charging current in each charging path of the initial equivalent circuit and a resistance value of each equivalent device in the equivalent circuit model; and determine one of the initial equivalent circuits having a minimum heat loss value under a same condition as a target charging circuit.

According to a third aspect of embodiments of the disclosure, provided is a non-transitory computer-readable storage medium having stored thereon an executable computer program that, when executed by a processor, is capable of implementing a method for determining a charging circuit, the method including: acquiring a preset equivalent circuit model including a preset number of charging paths, wherein one or more of the preset number of charging paths include a controllable device; controlling an operating state of each controllable device to obtain initial equivalent circuits, wherein each of the initial equivalent circuits include respective different charging paths; acquiring a charging current in each charging path of each of the initial equivalent circuits in a charging state; for each of the initial equivalent circuits, acquiring a heat loss value of the initial equivalent circuit based on the charging current in each charging path of the initial equivalent circuit and a resistance value of each equivalent device in the equivalent circuit model; and determining one of the initial equivalent circuits having a minimum heat loss value under a same condition as a target charging circuit.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the disclosure.

DETAILED DESCRIPTION

Exemplary embodiments will be described in detail herein, examples of which are illustrated in the accompanying drawings. When the following description refers to the drawings, the same numbers in different drawings indicate the same or similar elements unless otherwise indicated. The following described exemplary embodiments do not represent all embodiments consistent with the present disclosure. Rather, they are merely examples of devices consistent with some aspects of the disclosure as detailed in the appended claims.

In embodiments of the disclosure, provided is a method for determining a charging circuit. The method is applicable for a scenario of designing a charging circuit in an electronic device.

Figure 1:
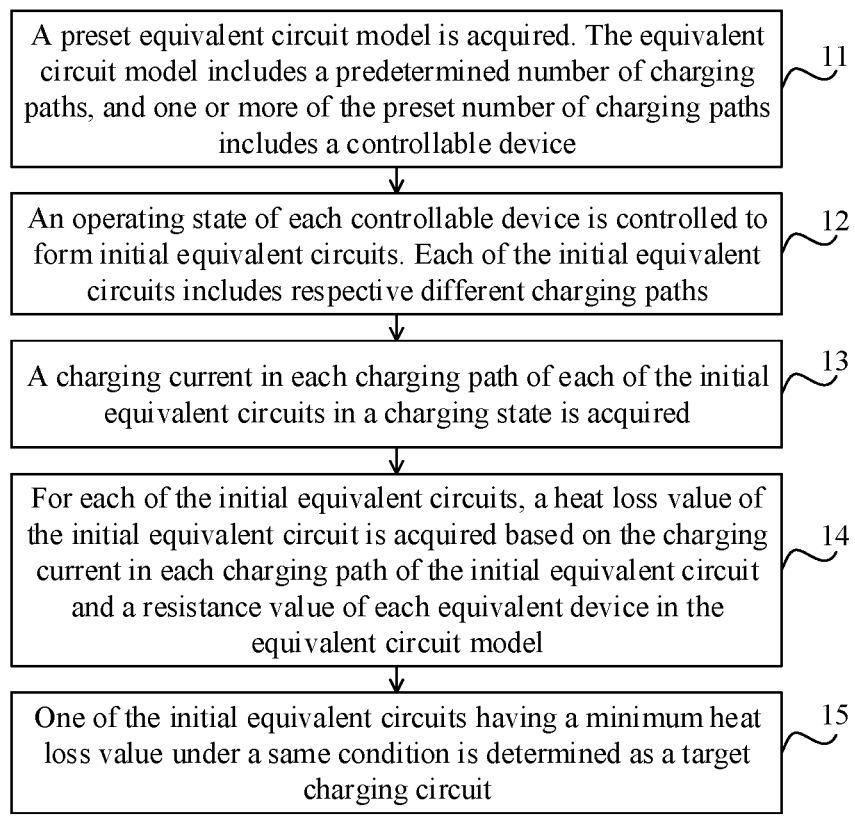
FIG. 1 illustrates a flowchart of a method for determining a charging circuit according to some embodiments.

FIG. 1 illustrates a flowchart of a method for determining a charging circuit according to some embodiments. The method for determining a charging circuit includes action 11 to action 15.

In action 11, a preset equivalent circuit model is acquired. The equivalent circuit model includes a predetermined number of charging paths, and one or more of the preset number of charging paths includes a controllable device.

In the embodiment, a preset equivalent circuit model may be stored in the electronic device. The equivalent circuit model may cover charging circuits of various usage scenarios.

Figure 2:
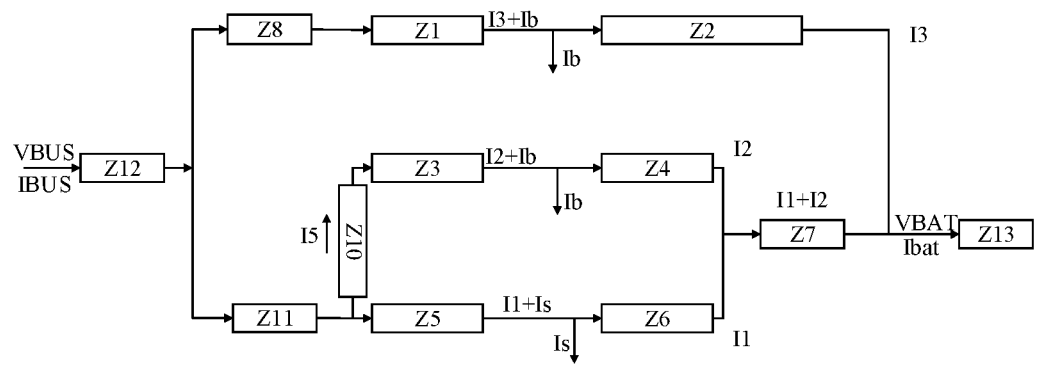
FIG. 2 illustrates a schematic diagram of an equivalent circuit model in the related art.

In an example, the equivalent circuit model includes two 2:1 charge pump circuits and a power management integrated circuit (PMIC). The two 2:1 charge pump circuits are a master charge pump circuit and a slave charge pump circuit respectively. In the related art, two 2:1 charge pump circuits and a PMIC may be arranged as follows:

(1) A structure including a mainboard and a secondary board. The PMIC and the master charge pump circuit are provided on the mainboard and the slave charge pump circuit is provided on the secondary board. In the related art, an equivalent circuit model needs to be built for such a circuit structure, as illustrated in FIG. 2.

(2) An L-shaped structure. The PMIC, the master charge pump circuit, and the slave charge pump circuit are all provided on the mainboard, and the master charge pump circuit and the slave charge pump circuit share an overvoltage protection (OVP) circuit. In the related art, an equivalent circuit model needs to be built for such a circuit structure, as illustrated in FIG. 3.

Figure 4:
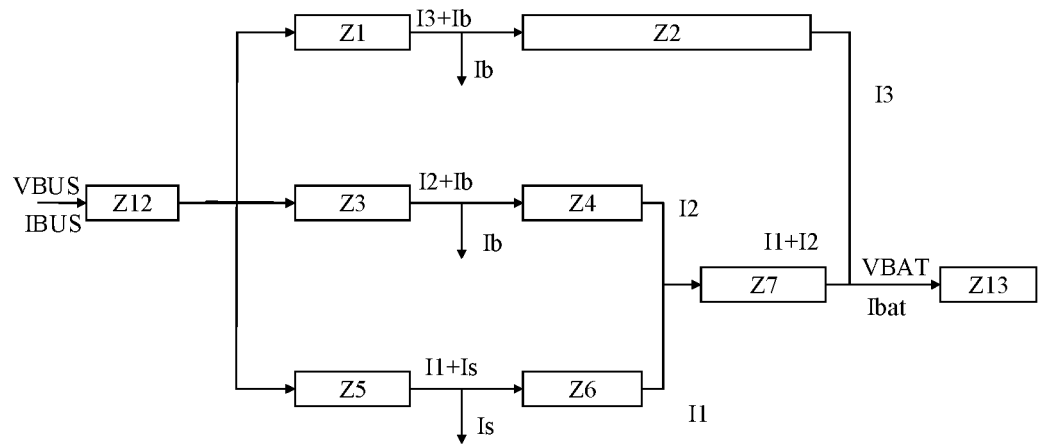
FIG. 4 illustrates a schematic diagram of yet another equivalent circuit model in the related art.

(3) An L-shaped structure. The PMIC circuit, the master charge pump circuit, and the slave charge pump circuit are all provided on the mainboard, and each of the PMIC circuit, the master charge pump circuit, and the slave charge pump circuit is provided with a respective OVP circuit. In the related art, an equivalent circuit model needs to be built for such a circuit structure, as illustrated in FIG. 4.

Described here are merely three equivalent circuit models corresponding to the case where two charge pump circuits are used in the related art. Through analysis of the above circuits, it can be seen that it is very cumbersome to obtain the above three equivalent circuit models, and the calculation amount is large. Therefore, the above equivalent circuit models are normalized in the embodiment to obtain one preset equivalent circuit model, as illustrated in FIG. 5.

Figure 3:
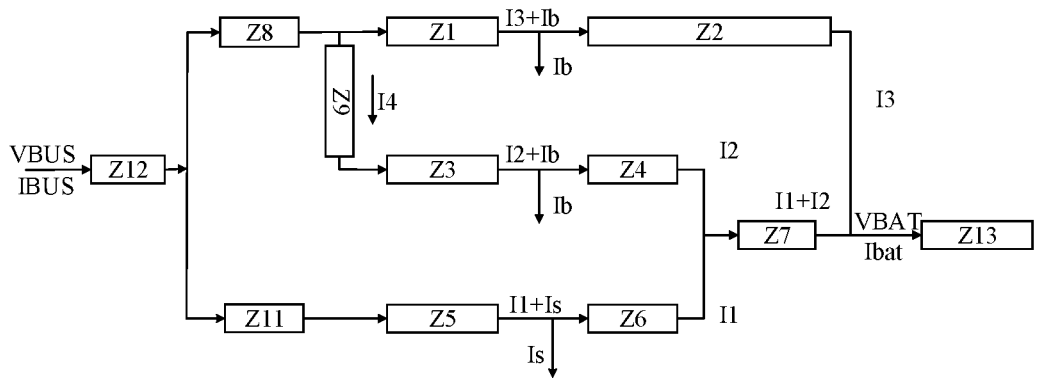
FIG. 3 illustrates a schematic diagram of another equivalent circuit model in the related art.

It is to be noted that equivalent devices in FIG. 2 and FIG. 3 may correspond to devices in actual circuits. For example, Z1 denotes path impedance. Z2 denotes equivalent impedance of a slave charge pump, impedance of a slave flexible printed circuit (FPC) of a battery and impedance of a battery connector. Z3 denotes path impedance. Z4 denotes equivalent impedance of a master charge pump and path impedance. Z5 denotes equivalent impedance of a PMIC. Z6 denotes impedance of a field effect transistor (FET) and path impedance. Z7 denotes impedance of a master FPC of the battery and impedance of the battery connector. Z8 denotes path impedance and impedance of an OVP circuit. Z9 denotes impedance of a controllable device. Z10 denotes impedance of a controllable device. Z11 denotes path impedance, impedance of an OVP circuit and impedance of an FPC. Z12 denotes TYPE-C interface impedance, path impedance, connection impedance, FPC impedance and connector impedance. Z13 denotes impedance of a pulse code modulation (PCM) board of the battery. It will be appreciated that the equivalent devices Z1~Z14 are illustrative only and may be adjusted accordingly with the actual circuit layout of the electronic device.

Figure 5:
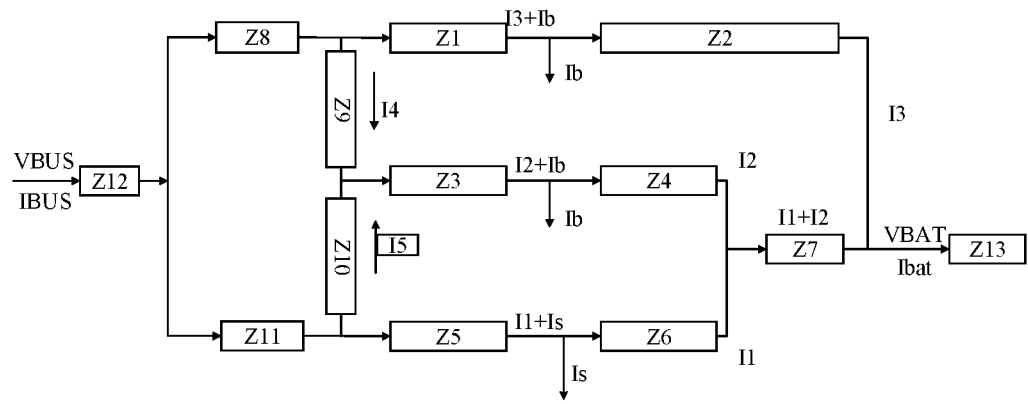
FIG. 5 illustrates a schematic diagram of an equivalent circuit model according to some embodiments.

As illustrated in FIG. 5, on the basis of the equivalent circuit model illustrated in FIG. 2, an equivalent device Z9 is added between the equivalent device Z1 and the equivalent device Z3 in the embodiment. Here, equivalent devices Z9 and Z10 are provided as controllable devices, such as controllable switches or controllable resistors.

In the embodiment, the electronic device may control an operating state of each controllable device. The operating state may include an ON state and an OFF state. In the ON state, the controllable device may be a non-zero resistor. In the OFF state, the resistance of the controllable device is infinite. In this example, by controlling the controllable device, the equivalent circuit model can be formed into initial equivalent circuits each containing different charging paths.

For example, by assigning infinity (e.g., 9999999999) to the resistance value of the controllable resistor Z9, which may be understood as removing the controllable resistor Z9 in FIG. 5, a first initial equivalent circuit may be obtained. The first initial equivalent circuit may be as illustrated in FIG. 2. That is, the first initial equivalent circuit refers to an equivalent circuit corresponding to the case where the PMIC and the master charge pump circuit are provided on the mainboard and the slave charge pump circuit is provided on the secondary board.

For another example, by assigning infinity (e.g., 9999999999) to the resistance value of the controllable resistor Z10, which may be understood as removing the controllable resistor Z10 in FIG. 5, a second initial equivalent circuit may be obtained. The second initial equivalent circuit may be as illustrated in FIG. 3. That is, the second initial equivalent circuit refers to an equivalent circuit corresponding to the case where the PMIC, the master charge pump circuit, and the slave charge pump circuit are all provided on the mainboard and the master charge pump circuit and the slave charge pump circuit share an OVP circuit.

For another example, by assigning infinity (e.g., 9999999999) to the resistance values of the controllable resistors Z9 and Z10, a third initial equivalent circuit may be obtained. The third initial equivalent circuit may be as illustrated in FIG. 4. That is, the third initial equivalent circuit refers to an equivalent circuit corresponding to the case where the PMIC, the master charge pump circuit, and the slave charge pump circuit are all provided on the mainboard, and each of the PMIC, the master charge pump circuit, and the slave charge pump circuit is provided with a respective OVP circuit.

In the embodiment, by controlling the controllable devices in the equivalent circuit model, the equivalent circuit model is enabled to generate different initial equivalent circuits, which can cover different circuit structures in the related art. That is, initial equivalent circuits corresponding to different circuit structures can be obtained by one modeling process in the embodiment. The time taken for scheme designing is reduced, and the calculation amount of equivalent models can be reduced.

It should be noted that, a scenario where two charge pump circuits are provided is illustrated as an example in the above FIG. 5 and the embodiments thereof. In practical application, an equivalent circuit model and an equivalent device serving as a controllable device in the equivalent circuit model may be adjusted according to the number of charge pump circuits, to achieve the effect that the equivalent circuit model can be adjusted by the controllable device. A phase change scheme falls within the protection scope of the present disclosure.

It should be noted that, considering the operation principle of the 2:1 charge pump circuit, preset transformation is performed on each 2:1 charge pump circuit in the equivalent circuit model in the embodiment. The preset transformation includes the following:

A voltage of the pre-stage circuit of the charge pump circuit is transformed to be 50% of that before the preset transformation is performed. A current of the pre-stage circuit of the charge pump circuit is transformed to be twice of that before the preset transformation is performed. A resistance of the pre-stage circuit of the charge pump circuit is transformed to be 25% of that before the preset transformation is performed.

Figure 6:
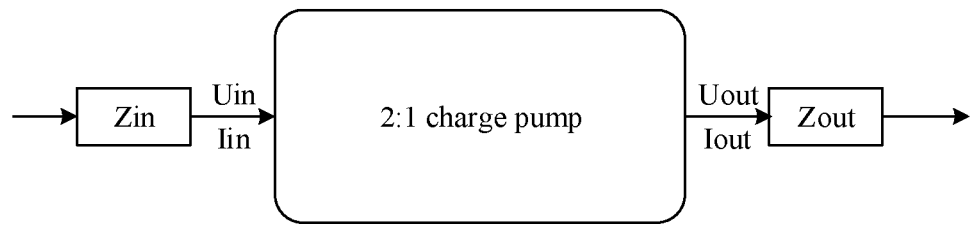
FIG. 6 illustrates a schematic diagram of a circuit in a branch where a 2:1 charge pump circuit without subjecting to transformation is located according to some embodiments.
Figure 7:
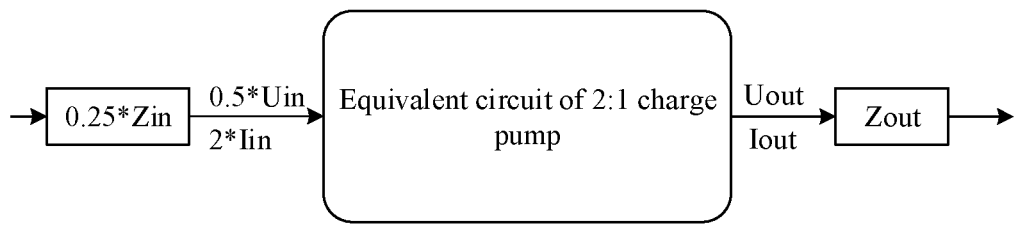
FIG. 7 illustrates a schematic diagram of a circuit in the branch where a transformed 2:1 charge pump circuit is located according to some embodiments.

Referring to FIG. 6 and FIG. 7, FIG. 6 illustrates a 2:1 charge pump circuit, a pre-stage circuit and a post-stage circuit, and FIG. 7 illustrates preset transformation of the 2:1 charge pump circuit to obtain an equivalent circuit of the pre-stage circuit on the post-stage.

By comparing FIG. 6 to FIG. 7, it can be seen that after the preset transformation, in the equivalent circuit of the 2:1 charge pump circuit, the input voltage Uin becomes 0.5Uin, the input current Iin becomes 2Iin, and the resistance Zin of the pre-stage circuit becomes 0.25Zin. It should be noted that the 2:1 charge pump circuit is considered to be an ideal device having no heat loss during the preset transformation.

In practical applications, the 2:1 charge pump circuit has heat loss. With continued reference to FIG. 6 and FIG. 7, it is assumed that Iin=1 amps, Iout=2 amps, Zin=4 ohms, Zout=1 ohms.

Before the preset transformation, the input voltage and input current of the pre-stage circuit are 13.2V and 1A respectively, and the output voltage and the output current of the pre-stage circuit are 9.2V and 1A respectively. The input voltage and input current of the 2:1 charge pump circuit are 9.2V and 1A respectively, and the output voltage and output current of the 2:1 charge pump circuit are 4.5V and 2A respectively. The input voltage and input current of the post-stage circuit are 4.5V and 2A respectively, and the output voltage and output current of the post-stage circuit are 2.5V and 2A respectively.

After the preset transformation, the input voltage and the input current of the pre-stage circuit are 6.6V and 2A respectively, and the output voltage and the output current of the pre-stage circuit are 4.6V and 2A respectively. The input voltage and input current of the 2:1 charge pump circuit are 4.6V and 2A respectively, and the output voltage and output current of the 2:1 charge pump circuit are 4.5V and 2A respectively. The input voltage and input current of the post-stage circuit are 4.5V and 2A respectively, and the output voltage and output current of the post-stage circuit are 2.5V and 2A respectively. The calculation procedure is as follows:

The resistance value of the pre-stage circuit is: $Zin'=(6.6V-4.6V)/2A=1\text{ ohm}=0.25Zin$.

The resistance of the equivalent circuit of the 2:1 charge pump is $Zeq=(4.6V-4.5V)/2A=0.05\text{ ohm}$.

Before the preset transformation:

$Iin=0.5*Iout=1A$.

$Uin=(Uout+Iout*Zeq)*2=(4.5V+2*0.05V)*2=9.6V$.

$Uusb=Uin+Iin*Zin=9.6V+1*4V=13.6V$.

After the preset transformation:
$Iin'=2Iin=2*0.5*Iout=Iout=2A$, that is, the current before and after the resistance is equal.

$Uin'=0.5*Uin=0.5*(Uout+Iout*Zeq)*2=Uout+Iout*Zeq=4.6V$.

$Zin'=(Uusb'-Uin')/Iin'=0.5*(Uusb-Uin)/2*Iin=0.25Zin$.

As can be seen from the above calculation, the circuit parameters before the transformation are equivalent to the circuit parameters after the transformation in the embodiment. That is, the preset transformation is correct.

In action 12, an operating state of each controllable device is controlled to obtain initial equivalent circuits. Each of the initial equivalent circuits includes respective different charging paths.

Description is continued with the example that 2 charge pumps are provided. In the embodiment, the first initial equivalent circuit, the second initial equivalent circuit, and the third initial equivalent circuit can be obtained respectively by controlling the controllable devices Z9 and Z10. For a specific method of control, reference may be made to the contents in action 11, and details will not be described herein.

In action 13, a charging current in each charging path of each of the initial equivalent circuits in a charging state is acquired.

In the embodiment, the electronic device can acquire the charging current in each charging path of each initial equivalent circuit in the charging state. In this case, the PMIC in the initial equivalent circuit operates in a BUCK mode.

With the example of solving the charging currents of the first initial equivalent circuit, MATLAB software is used to make calculation:

```
>>syms Z1 Z2 Z3 Z4 Z5 Z6 Z7 Z8 Z9 Z10 Z11
    VBAT Ib Is I1 I2 I3 I4 IBAT;
```

```
>>eqns3=[Z1*(I3+Ib)+Z2*I3==Z3*(I2+Ib)+Z4*I2+
    Z7*(I1+I2)+Z9*I6,

Z3*(I2+Ib)+Z4*I2+Z10*I5==Z5*(I1+Is)+Z6*I1,

Z8*(I3+Ib+I4)+Z9*I6==Z11*(I1+I5+Is)+Z10*I5,

IBAT==I1+I2+I3];//Z9 is infinite;

>>vars=[I1I2I3I4];
``` where Ib is the leakage current of the charger, and Is is the current corresponding to system power consumption.

With the example of solving the charging currents of the first initial equivalent circuit, MATLAB software is used to make calculation:

```
Z3*(I2+Ib)+Z4*I2+Z10*I5==Z5*(I1+Is)+Z6*I1",
    replaced with
```

(VBAT+DU)*I6*EQ==VBAT*(I1+Is);//EQ is the buck working efficiency and is a known variable.

In this way, the charging current in each charging path, or the current at the input terminal and the output terminal of each equivalent device can be obtained in the embodiment.

In action 14, for each of the initial equivalent circuits, a heat loss value of the initial equivalent circuit is acquired based on the charging current in each charging path of the initial equivalent circuit and a resistance value of each equivalent device in the equivalent circuit model.

In the embodiment, the electronic device may acquire the resistance value of each equivalent device in the equivalent circuit model. Then, for each equivalent device, the electronic device may calculate the heat loss value according to the input current of the equivalent device, thereby obtaining the heat loss value of each initial equivalent circuit.

It should be noted that each equivalent device in the equivalent circuit model has been equivalent to a resistance in the embodiment, and therefore the operation loss value of each equivalent device can be calculated according to the formula: $Q=I^2*R$ In action 15, one of the initial equivalent circuits having a minimum heat loss value under a same condition is determined as a target charging circuit.

In the embodiment, a judgment condition may be preset in the electronic device. Thus, based on the judgment condition, an initial equivalent circuit may be selected from multiple initial equivalent circuits. In this example, the judgment condition may be that the output current Ibat (for charging the battery) is the same. That is, under the condition that the input current of the battery is the same, the initial equivalent circuit with the minimum heat loss value is determined as the target charging circuit.

It may be understood that the target charging circuit determined in the embodiment can be used as the charging circuit of the designed electronic device, or that a charging circuit is selected from multiple initial equivalent circuits as the charging circuit of the designed electronic device.

Figure 8:
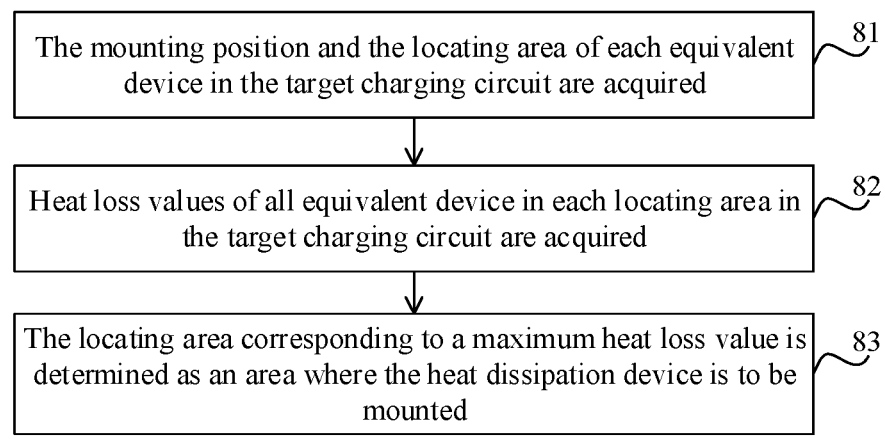
FIG. 8 illustrates a flowchart of acquiring a mounting area according to some embodiments.

In one or more embodiments, after determining the target charging circuit, the electronic device may be further provided with a heat dissipation device. Referring to FIG. 8, in action 81, the electronic device may acquire the mounting position and the locating area of each equivalent device in the target charging circuit. The locating area may include a mainboard area or a secondary board area. In action 82, the electronic device may acquire heat loss values of all equivalent devices in each locating area in the target charging circuit. In combination with the method of acquiring the heat loss value in action 14, the heat loss value of each equivalent device can be obtained. Heat loss values of all equivalent devices in each locating area are then acquired to obtain corresponding heat loss values in the locating area. In action 83, the electronic device may sort the heat loss values corresponding to the locating areas, and determine the locating area corresponding to a maximum heat loss value as the area where the heat dissipation device is to be mounted.

To this end, in the embodiments of the disclosure, the operation state of each controllable device in the preset equivalent circuit model can be controlled so that the equivalent circuit model can obtain initial equivalent circuits including different charging paths. Then, the charging current in each charging path of each initial equivalent circuit in a charging state can be acquired. After that, the heat loss value of each initial equivalent circuit can be acquired according to the charging current in each charging path and the resistance value of each equivalent device in the equivalent circuit model. Finally, an initial equivalent circuit having a minimum heat loss value under the same condition may be determined as a target charging circuit. In this way, the target charging circuit can be determined by only one equivalent circuit model establishment process in the embodiment, so that the number of times of equivalent circuit model establishment and the calculation amount can be reduced. The modeling time can be shortened, and the efficiency in designing the charging circuit can be improved.

Figure 9:
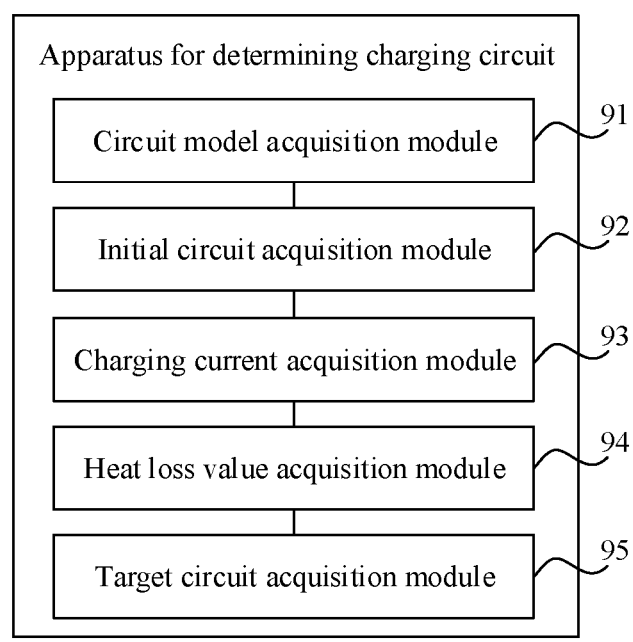
FIG. 9 illustrates a block diagram of an apparatus for determining a charging circuit according to some embodiments.

On the basis of the above method for determining a charging circuit, an apparatus for determining a charging circuit is also provided in embodiments of the disclosure. As illustrated in FIG. 9, the apparatus includes: a circuit model acquisition module 91, an initial circuit acquisition module 92, a charging current acquisition module 93, a heat loss value acquisition module 94 and a target circuit acquisition module 95.

The circuit model acquisition module 91 is configured to acquire a preset equivalent circuit model including a preset number of charging paths. One or more of the preset number of charging paths includes a controllable device.

The initial circuit acquisition module 92 is configured to control an operating state of each controllable device to form or obtain initial equivalent circuits. Each of the initial equivalent circuits includes respective different charging paths.

The charging current acquisition module 93 is configured to acquire a charging current in each charging path of each of the initial equivalent circuits in a charging state.

The heat loss value acquisition module 94 is configured to: for each of the initial equivalent circuits, acquire a heat loss value of the initial equivalent circuit based on the charging current in each charging path of the initial equivalent circuit and a resistance value of each equivalent device in the equivalent circuit model.

The target circuit acquisition module 95 is configured to determine one of the initial equivalent circuits having a minimum heat loss value under a same condition as a target charging circuit.

In one or more embodiments, the equivalent circuit model includes an equivalent circuit of a charge pump, and in the equivalent circuit model, preset transformation is performed on a pre-stage circuit of the charge pump circuit. The preset transformation includes the following: a voltage of the pre-stage circuit of the charge pump circuit is transformed to be 50% of that before the preset transformation is performed, a current of the pre-stage circuit of the charge pump circuit is transformed to be twice of that before the preset transformation is performed, and a resistance of the pre-stage circuit of the charge pump circuit is transformed to be 25% of that before the preset transformation is performed.

In one or more embodiments, the equivalent circuit model includes a master charge pump circuit and a slave charge pump circuit, and further includes a power management integrated circuit (PMIC). The initial equivalent circuits include at least one of a first initial equivalent circuit, a second initial equivalent circuit, or a third initial equivalent circuit. The first initial equivalent circuit corresponds to that the PMIC and the master charge pump circuit are provided on a mainboard and the slave charge pump circuit is provided on a secondary board. The second initial equivalent circuit corresponds to that the PMIC, the master charge pump circuit and the slave charge pump circuit are all provided on the mainboard and the master charge pump circuit and the slave charge pump circuit share an OVP circuit. The third initial equivalent circuit corresponds to that the PMIC, the master charge pump circuit and the slave charge pump circuit are all provided on the mainboard, and each of the PMIC, the master charge pump circuit and the slave charge pump circuit is provided with a respective OVP circuit.

In one or more embodiments, the apparatus further includes a mounting area acquisition module. The mounting area acquisition module includes: a locating area acquisition unit, a heat loss value acquisition unit, and a mounting area acquisition unit.

The locating area acquisition unit is configured to acquire a mounting position and a locating area of each equivalent device in the target charging circuit.

The heat loss value acquisition unit is configured to acquire a heat loss value of all equivalent devices in each locating area in the target charging circuit.

The mounting area acquisition unit is configured to determine a corresponding area with a maximum heat loss value as an area for mounting a heat dissipation device.

In one or more embodiments, the controllable device is a controllable resistor. When the controllable device is in a conductive state, the controllable resistor is a non-zero resistor; or when the controllable device is in an off state, a resistance value of the controllable resistor is infinite.

It will be appreciated that the apparatus provided in the embodiments of the present disclosure corresponds to the above-described method. For details, reference may be made to the contents of the various embodiments of the method, and details are will not be described herein.

The technical solution provided by the embodiments of the disclosure may include the following beneficial effects:

As can be seen from the above embodiments, in the embodiments of the disclosure, the operation state of each controllable device in the preset equivalent circuit model can be controlled so that the equivalent circuit model can form or obtain initial equivalent circuits including different charging paths. Then, the charging current in each charging path of each initial equivalent circuit in a charging state can be acquired. After that, the heat loss value of each initial equivalent circuit can be acquired according to the charging current in each charging path and the resistance value of each equivalent device in the equivalent circuit model. Finally, an initial equivalent circuit having a minimum heat loss value under the same condition may be determined as a target charging circuit. In this way, the target charging circuit can be determined by only one equivalent circuit model establishment process in the embodiment, so that the number of times of equivalent circuit model establishment and the calculation amount can be reduced. The modeling time can be shortened, and the efficiency in designing the charging circuit can be improved.

Figure 10:
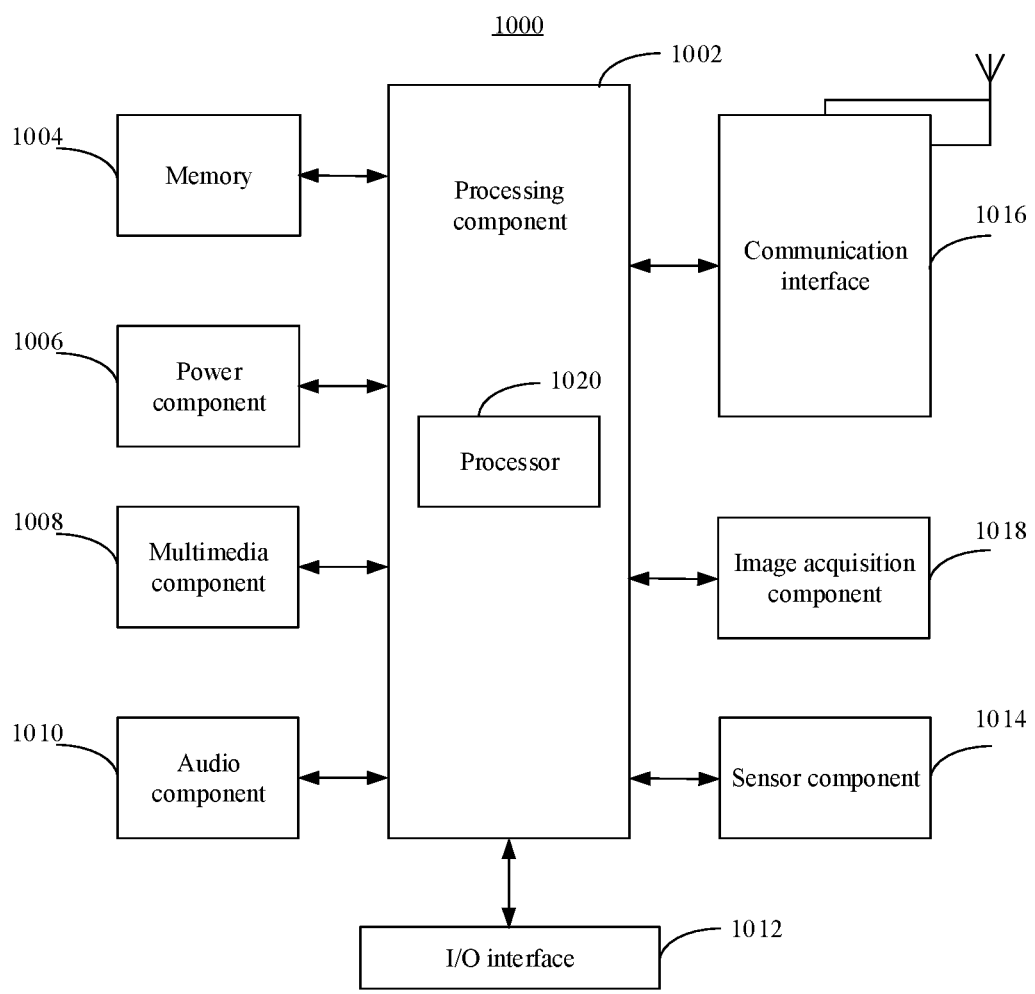
FIG. 10 illustrates a block diagram of an electronic device according to some embodiments.

FIG. 10 illustrates a block diagram of an electronic device according to some embodiments. For example, the electronic device 1000 may be a smartphone, a computer, a digital broadcast terminal, a tablet, a medical device, exercise equipment, a personal digital assistant, or the like.

Referring to FIG. 10, an electronic device 1000 may include one or more of: a processing component 1002, a memory 1004, a power component 1006, a multimedia component 1008, an audio component 1010, an input/output (I/O) interface 1012, a sensor component 1014, a communication component 1016, and an image acquisition component 1018.

The processing component 1002 generally controls the overall operation of the electronic device 1000, such as operations associated with displays, telephone calls, data communications, camera operations, and recording operations. The processing component 1002 may include one or more processors 1020 to execute a computer program. In addition, the processing component 1002 may include one or more modules to facilitate interaction between the processing component 1002 and other components. For example, the processing component 1002 may include a multimedia module to facilitate interaction between a multimedia component 1008 and the processing component 1002.

The memory 1004 is configured to store various types of data to support operation at the electronic device 1000. Examples of such data include computer programs for any application or method operating on electronic device 1000, contact data, phone book data, messages, pictures, video, and the like. Memory 1004 may be implemented by any type of volatile or non-volatile storage device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 1006 provides power to various components of electronic device 1000. The power component 1006 may include a power management system, one or more power supplies, and other components associated with generating, managing, and distributing power for electronic device 1000. The power component 1006 may include a power chip, and the controller may communicate with the power chip to control the power chip to turn on or off the switching device so that the battery may or may not supply power to the mainboard circuit.

The multimedia component 1008 includes a screen providing an output interface between the electronic device 1000 and the target object. In some embodiments, the screen may include a liquid crystal display (LCD) and a touch panel (TP). If the screen includes a touch panel, the screen may be implemented as a touch screen to receive input signals from the target object. The touch panel includes one or more touch sensors to sense touch, slide, and gestures on the touch panel. The touch sensor may not only sense the boundary of the touch or slide action, but also detect the duration and pressure associated with the touch or slide action.

The audio component 1010 is configured to output and/or input audio signals. For example, the audio component 1010 includes a microphone (MIC) configured to receive external audio signals when electronic device 1000 is in an operating mode, such as a call mode, a recording mode, and a speech recognition mode. The received audio signal may be further stored in the memory 1004 or transmitted via the communication component 1016. In some embodiments, the audio component 1010 further includes a speaker for outputting an audio signal.

The I/O interface 1012 provides an interface between the processing component 1002 and a peripheral interface module which may be a keyboard, a click wheel, a button, or the like.

The sensor component 1014 includes one or more sensors for providing state assessment of various aspects of the electronic device 1000. For example, the sensor component 1014 may detect an on/off state of the electronic device 1000, and a relative positioning of the components, such as a display screen and a keypad of the electronic device 1000. The sensor component 1014 may also detect a change in position of the electronic device 1000 or one of the components, the presence or absence of a target object in contact with the electronic device 1000, an orientation or acceleration/deceleration of the electronic device 1000, and a change in temperature of the electronic device 1000.

The communication component 1016 is configured to facilitate wired or wireless communication between the electronic device 1000 and other devices. The electronic device 1000 may access a communication specification based wireless network, such as WiFi, 2G, 3G, 4G, 5G, or a combination thereof. In one exemplary embodiment, the communication component 1016 receives broadcast signals or broadcast-related information from an external broadcast management system via a broadcast channel. In one exemplary embodiment, the communication component 1016 also includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology, and other technologies.

In an exemplary embodiment, the electronic device 1000 may be implemented by one or more application-specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components.

In an exemplary embodiment, there is also provided a non-transitory readable storage medium including an executable computer program, such as a memory 1004 including instructions. The executable computer program may be executed by a processor. The readable storage medium may be a ROM, a random access memory (RAM), a compact disc read-only memory (CD-ROM), a magnetic tape, a floppy disk, an optical data storage device, or the like.

Other embodiments of the disclosure will readily occur to those skilled in the art upon consideration of the specification and practice of the disclosure disclosed herein. This disclosure is intended to cover any variations, usages, or adaptations that follow the general principles of the disclosure and include common general knowledge or customary technical means in the art not disclosed here. The specification and embodiments are to be regarded as exemplary only, and the true scope and spirit of the disclosure subjects to only the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

It is to be understood that the disclosure is not limited to the precise structures already described above and illustrated in the accompanying drawings, and that various modifications and changes may be made without departing from the scope of the disclosure. The scope of the disclosure is limited only by the appended claims.

What is claimed is:

1. A method for determining a charging circuit, applied to a first electronic device, wherein the first electronic device is stored with a preset equivalent circuit model, the method comprising:

acquiring the preset equivalent circuit model comprising a preset number of charging paths, wherein one or more of the preset number of charging paths comprise a controllable device;

controlling an operating state of a first controllable device to obtain a first initial equivalent circuit, wherein the first initial equivalent circuit comprises a first charging path different than a second charging path of a second initial equivalent circuit comprising a second controllable device, and wherein the first controllable device and second controllable device include a first operating state in which the controllable device is a non-zero resistor, or a second operating state in which resistance of the controllable device is infinite;

acquiring a charging current in the charging path of the first initial equivalent circuit in a charging state;

acquiring a charging current in the charging path of the second initial equivalent circuit in a charging state;

for the first initial equivalent circuit, acquiring a heat loss value of the initial equivalent circuit based on the charging current in the charging path of the first initial equivalent circuit and a resistance value of the equivalent device in the equivalent circuit model;

for the second initial equivalent circuit, acquiring a heat loss value of the initial equivalent circuit based on the charging current in the charging path of the second initial equivalent circuit and a resistance value of the equivalent device in the equivalent circuit model;

determining one of the initial equivalent circuits having a minimum heat loss value under a same condition as a target charging circuit; and deploying, in a second electronic device, an actual charging circuit corresponding to the target charging circuit and using the actual charging circuit to charge for the second electronic device under the same condition.

2. The method of claim 1, wherein the equivalent circuit model comprises a charge pump circuit, and in the equivalent circuit model, preset transformation is performed on a pre-stage circuit of the charge pump circuit;

wherein the preset transformation comprises: transforming a voltage of the pre-stage circuit of the charge pump circuit to be 50% of that before the preset transformation is performed, transforming a current of the pre-stage circuit of the charge pump circuit to be twice of that before the preset transformation is performed, and transforming a resistance of the pre-stage circuit of the charge pump circuit to be 25% of that before the preset transformation is performed.

3. The method of claim 1, wherein the equivalent circuit model comprises a master charge pump circuit and a slave charge pump circuit, and further comprises a power management integrated circuit (PMIC);

wherein the initial equivalent circuits comprise at least one of the first initial equivalent circuit, the second initial equivalent circuit, or a third initial equivalent circuit;

wherein the first initial equivalent circuit corresponds to that the PMIC and the master charge pump circuit are provided on a mainboard and the slave charge pump circuit is provided on a secondary board;

wherein the second initial equivalent circuit corresponds to that the PMIC, the master charge pump circuit and the slave charge pump circuit are all provided on the mainboard and the master charge pump circuit and the slave charge pump circuit share an over-voltage protection (OVP) circuit; and wherein the third initial equivalent circuit corresponds to that the PMIC, the master charge pump circuit and the slave charge pump circuit are all provided on the mainboard, and each of the PMIC, the master charge pump circuit and the slave charge pump circuit is provided with a respective OVP circuit.

4. The method of claim 1, wherein after determining one of the initial equivalent circuits having the minimum heat loss value under the same condition as the target charging circuit, the method further comprises:

acquiring a mounting position and a locating area of equivalent device in the target charging circuit;

acquiring a heat loss value of all equivalent devices in each locating area in the target charging circuit; and determining a corresponding area with a maximum heat loss value as an area for mounting a heat dissipation device.

5. An apparatus for determining a charging circuit, applied to a first electronic device stored with a preset equivalent circuit model, the apparatus comprising:

a processor; and a memory for storing a computer program executable by the processor;

wherein the processor is configured to execute the computer program in the memory to:

acquire the preset equivalent circuit model comprising a preset number of charging paths, wherein one or more of the preset number of charging paths comprise a controllable device;

control an operating state of a first controllable device to obtain a first initial equivalent circuit, wherein the first initial equivalent circuit comprises a first charging path different than a second charging path of a second initial equivalent circuit comprising a second controllable device, and wherein the first controllable device and second controllable device include a first operating state in which the controllable device is a non-zero resistor, or a second operating state in which resistance of the controllable device is infinite;

acquire a charging current in the charging path of the first initial equivalent circuit in a charging state;

acquire a charging current in the charging path of the second initial equivalent circuit in a charging state;

for the first initial equivalent circuit, acquire a heat loss value of the initial equivalent circuit based on the charging current in the charging path of the first initial equivalent circuit and a resistance value of the equivalent device in the equivalent circuit model;

for the second initial equivalent circuit, acquire a heat loss value of the initial equivalent circuit based on the charging current in the charging path of the second initial equivalent circuit and a resistance value of the equivalent device in the equivalent circuit model;

determine one of the initial equivalent circuits having a minimum heat loss value under a same condition as a target charging circuit; and deploy, in a second electronic device, an actual charging circuit corresponding to the target charging circuit and using the actual charging circuit to charge for the second electronic device under the same condition.

6. The apparatus of claim 5, wherein the equivalent circuit model comprises a charge pump circuit, and in the equivalent circuit model, preset transformation is performed on a pre-stage circuit of the charge pump circuit;

wherein the preset transformation comprises: transforming a voltage of the pre-stage circuit of the charge pump circuit to be 50% of that before the preset transformation is performed, transforming a current of the pre-stage circuit of the charge pump circuit to be twice of that before the preset transformation is performed, and transforming a resistance of the pre-stage circuit of the charge pump circuit to be 25% of that before the preset transformation is performed.

7. The apparatus of claim 5, wherein the equivalent circuit model comprises a master charge pump circuit and a slave charge pump circuit, and further comprises a power management integrated circuit (PMIC);
   wherein the initial equivalent circuits comprise at least one of the first initial equivalent circuit, the second initial equivalent circuit, or a third initial equivalent circuit;
   wherein the first initial equivalent circuit corresponds to that the PMIC and the master charge pump circuit are provided on a mainboard and the slave charge pump circuit is provided on a secondary board;
   wherein the second initial equivalent circuit corresponds to that the PMIC, the master charge pump circuit and the slave charge pump circuit are all provided on the mainboard and the master charge pump circuit and the slave charge pump circuit share an over-voltage protection (OVP) circuit; and
   wherein the third initial equivalent circuit corresponds to that the PMIC, the master charge pump circuit and the slave charge pump circuit are all provided on the mainboard, and the PMIC, the master charge pump circuit and the slave charge pump circuit is provided with a respective OVP circuit.

8. The apparatus of claim 5, wherein the processor is further configured to:
   acquire a mounting position and a locating area of equivalent device in the target charging circuit;
   acquire a heat loss value of all equivalent devices in each locating area in the target charging circuit; and
   determine a corresponding area with a maximum heat loss value as an area for mounting a heat dissipation device.

9. A non-transitory computer-readable storage medium having stored thereon an executable computer program that, when executed by a processor of a first electronic device stored with a preset equivalent circuit model, is capable of implementing a method for determining a charging circuit, the method comprising:
   acquiring the preset equivalent circuit model comprising a preset number of charging paths, wherein one or more of the preset number of charging paths comprise a controllable device;
   controlling an operating state of a first controllable device to obtain a first initial equivalent circuit, wherein the first initial equivalent circuit comprises a first charging path, different than a second charging path of a second initial equivalent circuit comprising a second controllable device, and wherein the first controllable device and second controllable device include a first operating state in which the controllable device is a non-zero resistor, or a second operating state in which resistance of the controllable device is infinite;
   acquiring a charging current in the charging path of the first initial equivalent circuit in a charging state;
   acquiring a charging current in the charging path of the second initial equivalent circuit in a charging state;
   for the first initial equivalent circuit, acquiring a heat loss value of the initial equivalent circuit based on the charging current in the charging path of the first initial equivalent circuit and a resistance value of the equivalent device in the equivalent circuit model;
   for the second initial equivalent circuit, acquiring a heat loss value of the initial equivalent circuit based on the charging current in the charging path of the second initial equivalent circuit and a resistance value of the equivalent device in the equivalent circuit model;
   determining one of the initial equivalent circuits having a minimum heat loss value under a same condition as a target charging circuit; and
   deploying, in a second electronic device, an actual charging circuit corresponding to the target charging circuit and using the actual charging circuit to charge for the second electronic device under the same condition.

10. The non-transitory computer-readable storage medium of claim 9, wherein the equivalent circuit model comprises a charge pump circuit, and in the equivalent circuit model, preset transformation is performed on a pre-stage circuit of the charge pump circuit;
   wherein the preset transformation comprises: transforming a voltage of the pre-stage circuit of the charge pump circuit to be 50% of that before the preset transformation is performed, transforming a current of the pre-stage circuit of the charge pump circuit to be twice of that before the preset transformation is performed, and transforming a resistance of the pre-stage circuit of the charge pump circuit to be 25% of that before the preset transformation is performed.

11. The non-transitory computer-readable storage medium of claim 9, wherein the equivalent circuit model comprises a master charge pump circuit and a slave charge pump circuit, and further comprises a power management integrated circuit (PMIC);
   wherein the initial equivalent circuits comprise at least one of the first initial equivalent circuit, the second initial equivalent circuit, or a third initial equivalent circuit;
   wherein the first initial equivalent circuit corresponds to that the PMIC and the master charge pump circuit are provided on a mainboard and the slave charge pump circuit is provided on a secondary board;
   wherein the second initial equivalent circuit corresponds to that the PMIC, the master charge pump circuit and the slave charge pump circuit are all provided on the mainboard and the master charge pump circuit and the slave charge pump circuit share an over-voltage protection (OVP) circuit; and
   wherein the third initial equivalent circuit corresponds to that the PMIC, the master charge pump circuit and the slave charge pump circuit are all provided on the mainboard, and each of the PMIC, the master charge pump circuit and the slave charge pump circuit is provided with a respective OVP circuit.

12. The non-transitory computer-readable storage medium of claim 9, wherein after determining one of the initial equivalent circuits having the minimum heat loss value under the same condition as the target charging circuit, the method further comprises:
   acquiring a mounting position and a locating area of each equivalent device in the target charging circuit;
   acquiring a heat loss value of all equivalent devices in each locating area in the target charging circuit; and
   determining a corresponding area with a maximum heat loss value as an area for mounting a heat dissipation device.

* * * * *